(12) United States Patent
Juma et al.

(10) Patent No.: US 12,403,858 B1
(45) Date of Patent: Sep. 2, 2025

(54) SUPPLEMENTAL INFLATABLE RESTRAINT INSTALLATION SYSTEM

(71) Applicant: GM GLOBAL TECHNOLOGY OPERATIONS LLC, Detroit, MI (US)

(72) Inventors: Jamal Juma, Macomb, MI (US); Kenneth M. Zawisa, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/807,876

(22) Filed: Aug. 16, 2024

(51) Int. Cl.
*B60R 21/213* (2011.01)

(52) U.S. Cl.
CPC .................. *B60R 21/213* (2013.01)

(58) Field of Classification Search
CPC .... B60R 21/213; B60R 21/232; B60R 21/214
See application file for complete search history.

(56) References Cited

U.S. PATENT DOCUMENTS

| | | | | |
|---|---|---|---|---|
| 5,752,713 | A * | 5/1998 | Matsuura | B60R 21/23138 280/730.2 |
| 5,899,486 | A * | 5/1999 | Ibe | B60R 21/232 280/730.2 |
| 6,176,515 | B1 * | 1/2001 | Wallner | B60R 21/2338 280/730.2 |
| 6,189,960 | B1 * | 2/2001 | Mumura | B60J 7/0015 180/281 |
| 6,505,853 | B2 * | 1/2003 | Brannon | B60R 21/2338 280/730.2 |
| 6,896,288 | B2 * | 5/2005 | Tanaka | B60R 21/232 280/730.2 |
| 7,125,038 | B2 * | 10/2006 | Gammill | B60R 21/232 280/730.2 |
| 8,632,093 | B2 * | 1/2014 | Fischer | B60R 21/217 280/730.2 |
| 9,333,934 | B2 * | 5/2016 | Sitko | B60R 21/213 |
| 9,539,974 | B2 * | 1/2017 | Fukuda | B60R 21/232 |
| 9,771,048 | B2 * | 9/2017 | Min | B60R 21/2338 |
| 10,471,924 | B2 * | 11/2019 | Min | B60R 21/214 |
| 11,167,715 | B2 * | 11/2021 | Ballam | B60R 21/232 |
| 11,192,518 | B2 * | 12/2021 | Kang | B60R 21/213 |
| 11,254,279 | B2 * | 2/2022 | Lee | B60R 21/213 |
| 11,358,556 | B2 * | 6/2022 | Min | B60R 21/214 |
| 11,958,430 | B1 * | 4/2024 | Faruque | B60R 21/213 |

(Continued)

FOREIGN PATENT DOCUMENTS

| GB | 2309942 A | 8/1997 |
|---|---|---|
| JP | 2004210099 A | 7/2004 |

OTHER PUBLICATIONS

U.S. Appl. No. 18/736,454, filed Jun. 6, 2024. Roof Airbags and Methods of Installation Thereof.

*Primary Examiner* — Laura Freedman
(74) *Attorney, Agent, or Firm* — Ingrassia Fisher & Lorenz, LLP | IF&L

(57) ABSTRACT

A supplemental inflatable restraint installation system for roof rail airbags in vehicles. A supplemental restraint system for a vehicle includes two mounts connected to the vehicle. An inflatable bag includes a retainer, and a rod extends between the two mounts. The rod extends through the retainer to secure the inflatable bag to the vehicle with a minimum number of fastening points.

20 Claims, 4 Drawing Sheets

(56) References Cited

U.S. PATENT DOCUMENTS

2005/0206135 A1* 9/2005 Nelson ................ B60R 21/2338
                                                              280/730.2
2008/0122203 A1* 5/2008 Steinbach .............. B60N 3/026
                                                              280/728.2

* cited by examiner

SUPPLEMENTAL INFLATABLE RESTRAINT INSTALLATION SYSTEM

INTRODUCTION

The technical field generally relates to supplemental inflatable restraint systems in vehicles and installation systems thereof, and more particularly relates to roof rail or curtain airbags that include structural members configured to install the airbags in a vehicle with a minimal number of fasteners.

Supplemental inflatable restraint systems of the airbag type, including those referred to as curtain airbags or side curtain airbags, are features in vehicles designed to deploy and restrain occupants under certain conditions. Unlike supplemental inflatable restraints that deploy from the steering wheel or dashboard, roof rail airbags deploy from the trim components above or around the side windows, such as from under the headliner, and when deployed may cover the window areas like curtains.

In certain events, sensors in the vehicle detect the conditions and trigger the deployment of the roof rail airbags. The airbags inflate rapidly, forming a barrier along the side windows and pillars. The inflated airbags may cover the surfaces of the vehicle's interior, such as the side windows and/or pillars. Roof rail airbags may extend along any part of the cabin's side along the front to the rear of the vehicle's cabin, covering the side window area.

To maintain an airbag in its desired position, a number of attachment points may be used along the roof rails and/or pillars of the vehicle body. Installation may require numerous fastening operations to provide the desired amount of retention. Accordingly, there is an ongoing desire for systems that simplify assemble operations and to deliver desired functionality of roof rail airbags. Furthermore, other desirable features and characteristics of the present disclosure will become apparent from the subsequent detailed description and the appended claims, taken in conjunction with the accompanying drawings and the foregoing introduction.

SUMMARY

A supplemental inflatable restraint installation system is provided for vehicles. In a number of embodiments, a supplemental restraint system for a vehicle includes a pair of fasteners connected to the vehicle. An inflatable bag has a loop. A rod extends between, and is connected with, the fasteners. The rod extends through the loop and retains the inflatable bag to the vehicle.

In additional embodiments, the rod has a slip fit within the retainer.

In additional embodiments, the rod is conformable to a profile of the vehicle.

In additional embodiments, the vehicle includes a body with a roof rail, and the inflatable bag is secured to the roof rail by the mounts and the rod.

In additional embodiments, the airbag and the retainer are fabricated from a common material.

In additional embodiments, the retainer has a sleeve through which the rod extends. The sleeve extends substantially completely between the mounts.

In additional embodiments, the mounts each have a structure that has a barrel section and a strap section, and the rod extends through the barrel section of the mounts.

In additional embodiments, the mounts each have a structure that has a barrel section and a strap section. The rod extends through the barrel section of each of the mounts, and the strap section of each of the mounts is secured to the vehicle.

In additional embodiments, the retainer completely encircles the rod.

In additional embodiments, the rod is secured to the mounts in fixed positions.

In a number of additional embodiments, a supplemental restraint system for a vehicle includes a pair of mounts fixed to the vehicle and includes an inflatable bag. A retainer is connected with the inflatable bag, and a rod extends between, and is connected with, the mounts. The rod extends through the retainer to secure the inflatable bag to the vehicle.

In additional embodiments, the retainer operates to slip along the rod while remaining secured to the rod during a deployment of the inflatable bag.

In additional embodiments, the rod is conformable to a profile of the vehicle during installation of the inflatable bag in the vehicle.

In additional embodiments, the vehicle includes a body with a roof rail and an A-pillar, and the inflatable bag is secured to the roof rail and the A-pillar.

In additional embodiments, the airbag and the retainer are fabricated from a common woven material.

In additional embodiments, the retainer has a sleeve through which the rod extends, and the sleeve extends substantially completely between the mounts with a gap in the sleeve at one of the mounts.

In additional embodiments, the mounts each have a structure that has a barrel section and a strap section integral with the barrel section, and the rod extends through the barrel section of each of the mounts.

In additional embodiments, the mounts each have a structure that has a barrel section and a strap section integral with the barrel section. The rod extends through the barrel section of each of the mounts. The strap section of each of the mounts is secured to the vehicle by a fastener.

In additional embodiments, the rod extends from one mount on both of its sides, and the inflatable bag is connected with the rod on both sides.

In a number of other embodiments, a supplemental restraint system for a vehicle includes a body of the vehicle that has a roof rail. A pair of mounts are fixed to the roof rail. An inflatable bag is included. A retainer is connected with the inflatable bag and has a structure that loops over the rod. The structure includes ends that are each fixed to the inflatable bag. A rod extends between, and is connected with, the mounts. The rod extends through the retainer to secure the inflatable bag to the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
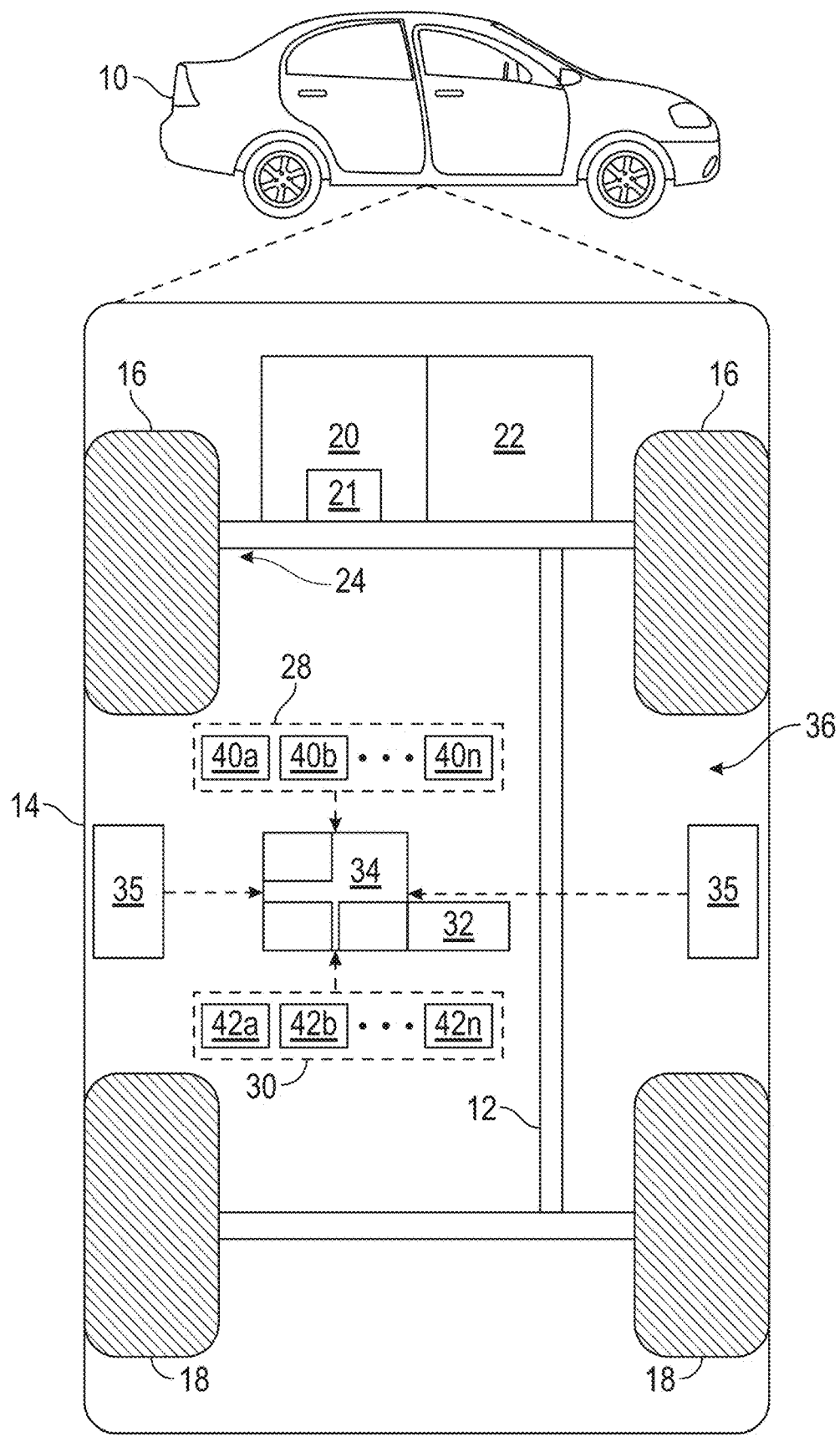
FIG. 1 is a functional block diagram of a vehicle including a supplemental inflatable restraint installation system for roof rail type airbags, in accordance with various embodiments.

FIG. 1 illustrates a vehicle 10, according to an embodiment. In certain examples, the vehicle 10 comprises an automobile. The vehicle 10 may include various restraint systems such as a roof airbag system having curtain or roof rail airbags for restraining occupants of the vehicle 10 in certain triggering events. The roof rail airbags may include one or more features configured to promote proper installation and operation of the roof rail airbags, including a type of rod-like structural member that simplifies installation of the airbag system into the vehicle 10.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

Figure 2:
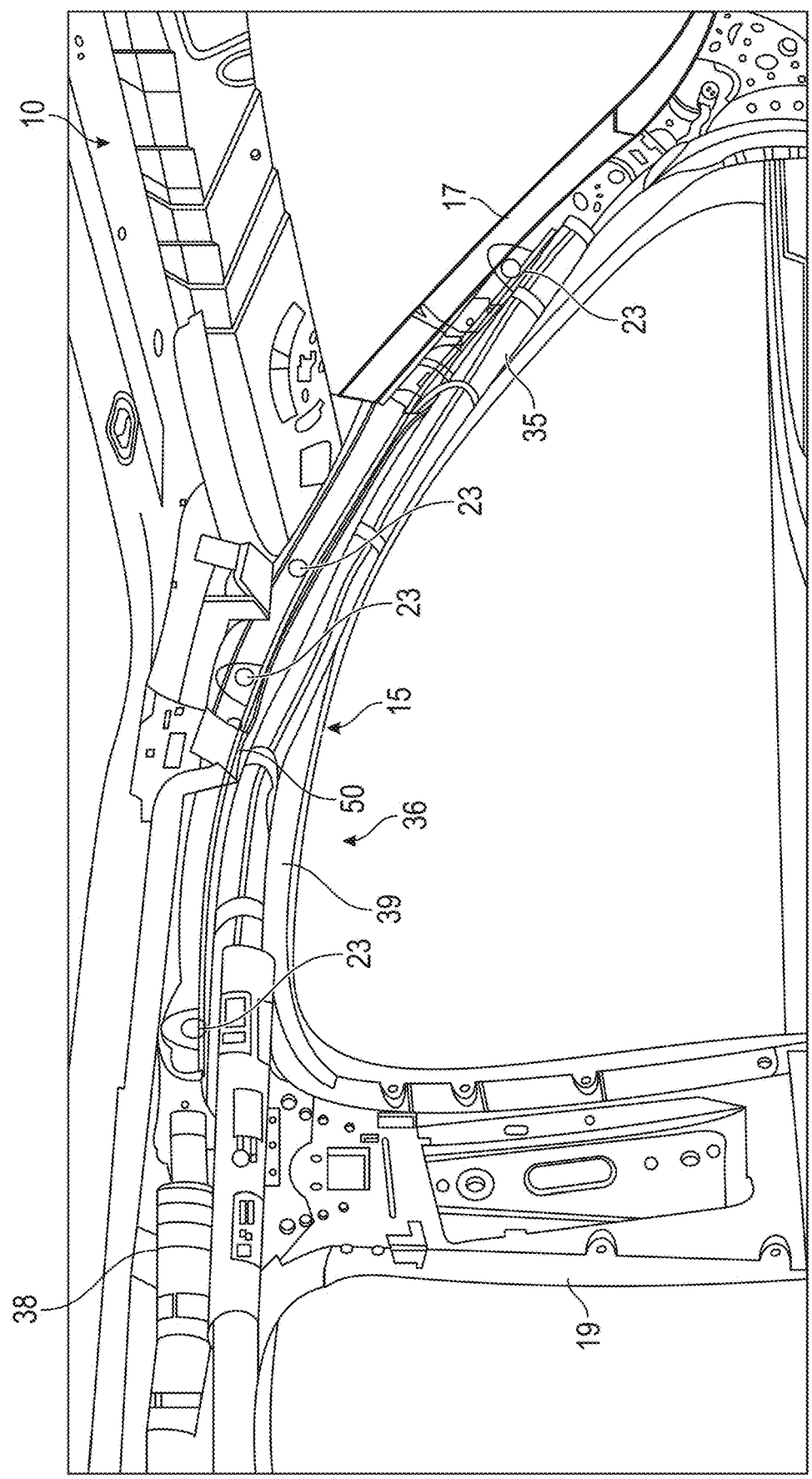
FIG. 2 is an interior view of the roof airbag installed to a roof rail of the vehicle of FIG. 1 in accordance with various embodiments.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a body 15 (FIG. 2). The wheels 16-18 are each rotationally coupled to the chassis 12 near a respective corner of the body 14.

The vehicle 10 further includes a propulsion system 20, a transmission system 22, a sensor system 28, an actuator system 30, at least one data storage device 32, at least one controller 34, and a supplemental inflatable restraint installation system 36 including or associated with one or more airbags 35. The airbag(s) 35 may be a side curtain airbag, and/or a roof rail air bag, or another type. The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16, 18 according to selectable speed ratios. According to various examples, the transmission system 22 may include a multi-ratio automatic transmission, a continuously variable transmission, or other appropriate transmission. The steering system 24 influences positions of the wheels 16, 18.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, current sensors, voltage sensors, temperature sensors, motor speed sensors, position sensors, radars, lidars, global positioning systems, optical cameras, thermal cameras, ultrasonic sensors, inertial measurement units, pressure sensors, position sensors, speed sensors, and/or other sensors. One of more of the sensing devices 40a-40n may be functional, individually or in combination, to indicate to the controller 34 that the vehicle 10 has been or will be in a collision or rollover event.

The actuator system 30 includes one or more actuator devices 42a-42n that control one or more vehicle features such as, but not limited to, the propulsion system 20, the transmission system 22, and/or the supplemental inflatable restraint installation system 36, including the roof rail airbags 35. One or more of the actuator devices 42a-42n may be functional, individually or in combination, to initiate deployment of the airbag(s) 35 in response to predetermined conditions, such as detection that the vehicle 10 has been or will be in an airbag inflation triggering event.

In some examples, the airbag(s) 35 may include multiple airbags strategically placed throughout the cabin of the vehicle 10, including front, side, and roof rail airbags, to provide comprehensive protection. If an airbag inflation triggering event occurs, one or more of the sensing devices 40a-40n detect, for example, the rapid deceleration of the vehicle 10 and send signals to the controller 34. In response to these sensed events, the controller 34 triggers the deployment, such as through an inflator 38, of one or more of the airbags, such as the airbag(s) 35.

Referring to FIG. 2, with continued reference to FIG. 1, an exemplary installation of an airbag 35 is presented with the supplemental inflatable restraint installation system 36. It should be appreciated that the airbag 35 will be covered/concealed by interior trim components (not shown) of the vehicle 10, which are omitted for visibility. The airbag 35 may be secured to a roof rail 39 of the body 15 of the vehicle 10 that extends along the top, for example, of an A-pillar 17 of the body 15. The airbag 35 may also be secured to the A-pillar 17. In some embodiments, the airbag(s) 35 may extend over a B-pillar 19, and towards, over, and/or along a C-pillar (not shown) and/or D-pillar (not shown). FIG. 2 shows a portion of the vehicle 10 as including the supplemental inflatable restraint installation system 36 of the airbag 35 secured to and extending along the A pillar 17 and over the B pillar 19 on the roof rail 39. In this embodiment, the airbag 35 is secured to the body 15 with the supplemental inflatable restraint installation system 36.

Figure 3:
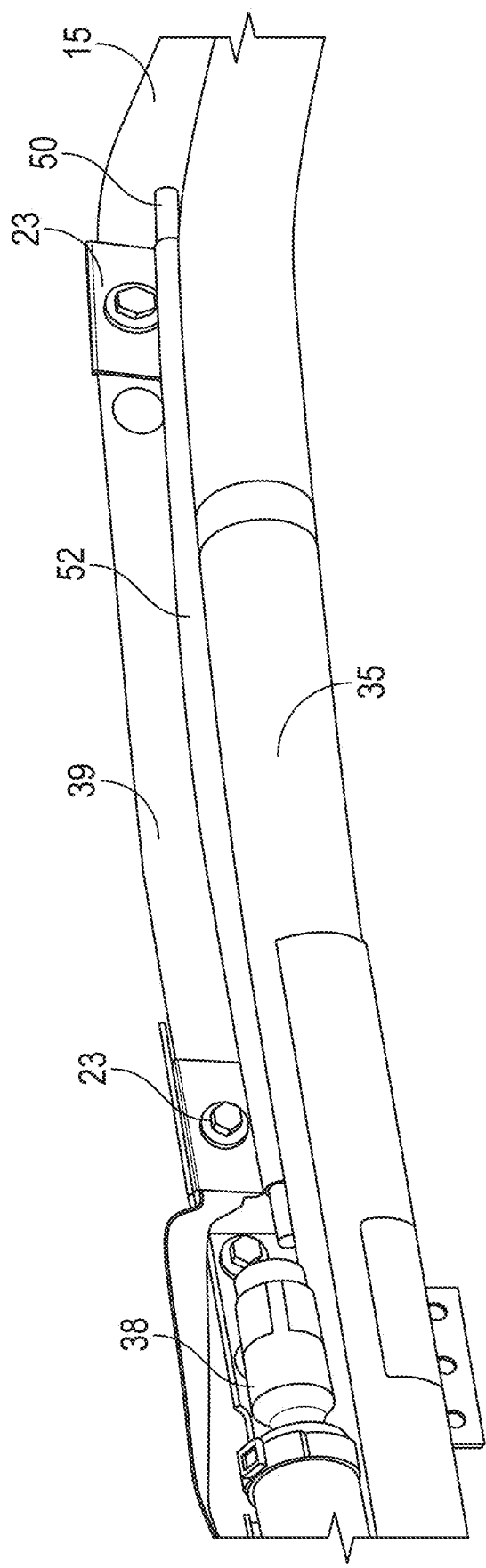
FIG. 3 is a perspective view of a portion of the roof airbag of FIG. 2, in accordance with various embodiments.

Referring to FIG. 3, along with FIGS. 1 and 2, the airbag 35, includes a deployable, inflatable body configured to automatically deploy, via the inflator 38, in response to detection of an airbag inflation triggering event (e.g., as sensed by the sensor system 28, detected by the controller 34, and initiated by the actuator system 30) to cover portions of an interior side of a vehicle 10 upon being deployed. The airbag 35 may be made of a semi-flexible material (e.g., a fabric), and may include reinforcements and/or other components at select locations. The airbag 35 is packed, such as by being rolled or folded, when in the undeployed state shown. At least two mounts 23 connect, through a rod 50 (or rods), the airbag 35 with the body 15 of the vehicle 10 such as at the roof rail 39 and/or the A-pillar 17.

The rod 50 extends between at least two of the mounts 23 and more than two mounts 23 may be used to connect the rod (with the airbag 35) to the body 15 if desired. The rod 50 may be made of a solid construction, may be hollow, or may be made of a plural number of materials. In embodiments, multiple rods 50 may be used, with each connected to the body 15 by at least two mounts 23. The rod(s) 50 may have a round cross section or another shape and are made of a material to provide sufficient rigidity to hold the airbag 35 during deployment to withstand kinematic forces. For example, the rod(s) 50 may be made of a metal, such as steel, a composite, such as a carbon (or other) fiber reinforced polymer, or another material. The rod(s) 50 may be pre-formed with bends, or may be conformable during installation to follow the contour of the body 15 to which it is attached. For example, the rod(s) 50 may have sufficient deformability or flexibility to aid in installation to the contour during installation, while having sufficient rigidity to retain the airbag 35 to the vehicle 10.

The air bag 35 includes a retainer 52 or multiple retainers 52 of a material through which the rod 50 may be inserted, or in which the rod 50 is disposed. In the current embodiment, the retainer 52 is a sleeve, made of material connected to, or formed as part of, the airbag 35, and the rod 50 extends through the sleeve. In embodiments, the retainers(s) 52 may be made of the same or a different material than the airbag 35 and in any case may by coupled to, or formed with, the airbag 35 such as by sewing, fastening, weaving, bonding, or by other means. In embodiments, the retainer(s) 52 may be straps, hoops, hooks, hangers, braided strands, bands, tabs, rings, loops, sleeves, pockets, tubes, or other configurations that may encircle (at least partially), the rod 50 and function to connect the airbag 35 to the rod 50. In general, the rod 50 slip fits within the retainer(s) 52, that may be provided as a part of the assembly of the airbag 35. Slip fit means that the rod 50 may be inserted through the retainer(s) 52 with no or insignificant resistance. There may be one or a plural number of retainers 52 between each pair of adjacent mounts 23. During assembly, the rod 50 is inserted through the retainer(s) 52 and the rod 50 is connected to the roof rail 39 by the mounts 23 securing the airbag 35 to the body 15. Including the rod(s) 50 reduces the number of mounts 23 that would otherwise be needed and simplifies assembly. The retainer(s) 52 may loop over the rod 50 and may include ends of the looping structure that are each fixed to the inflatable part of airbag 35. The airbag 35 may include reinforcements at and/or around the retainer(s) 52.

Figure 5:
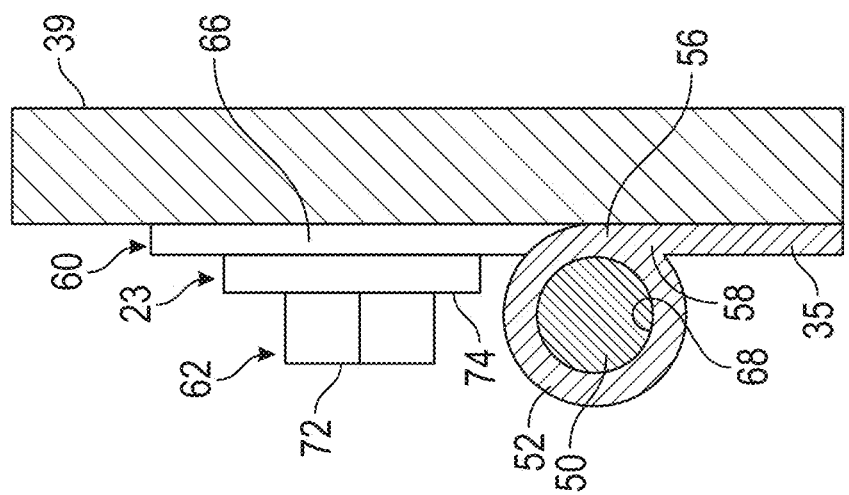
FIG. 5 is a sectional view take generally through the line 5-5 in FIG. 4, in accordance with various embodiments.
Figure 4:
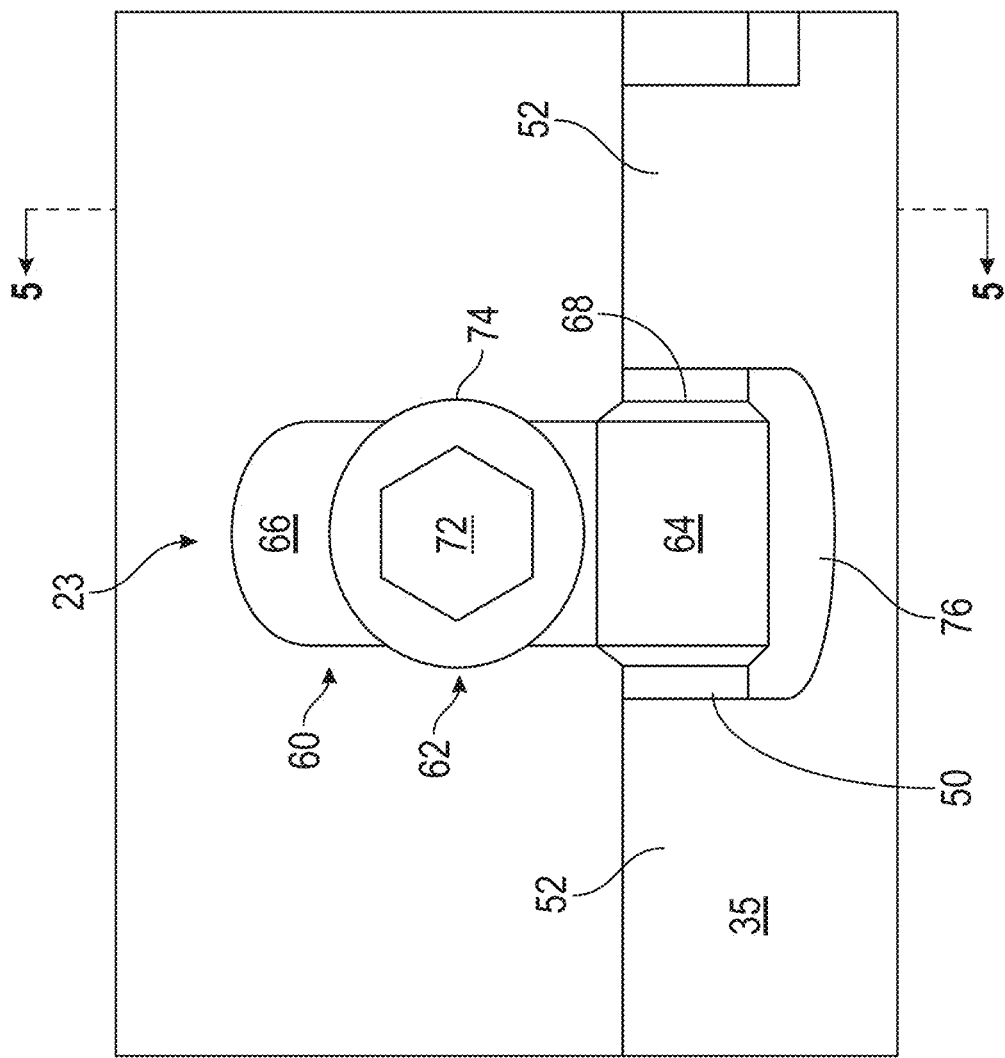
FIG. 4 is a view of the attachment area of the roof airbag of FIGS. 2 and 3, in accordance with various embodiments.

Referring additionally to FIGS. 4 and 5, the mounts 23 may be in the form of P-brackets and each includes a hanger 60 and a fastener 62. The hanger 60 includes a barrel section 64 and a strap section 66. In the current embodiment, the barrel section 64 and the strap section 66 are integrally formed, such as of a metal. The barrel section 64 includes an opening 68 through which the rod 50 extends and is shaped to encircle the rod 50. The strap section 66 may be flat and extends from the barrel section 64. In embodiments, the strap section 66 may be formed with a shape to mate with a contoured part of the body 15, such as of the roof rail 39. The fastener 62 connects the strap section 66 to the body 15. In the current embodiment, the fastener 62 includes a screw 72 with a washer 74, where the screw 72 extends through the strap section 66 and is threaded into the body 15. In embodiments, the fastener 62 may be another type of mechanical fastener or the mount 23 may be connected to the body 15 by another means such as welding. The barrel section 64 may be secured to the rod 50 to maintain relative position. For example, the two may be secured by a press fit, a tack weld, a staking operation, bonding, or another means. As a result, when installed in the vehicle 10 the rod 50 may be retained in a fixed position relative to the body 15.

As shown in FIG. 4, the airbag 35 includes two retainers 52, with a gap 76 between the two at the mount 23. The two retainers 52 are configured as a sleeve to the left (as viewed) of the mount 23 and as a strap to the right (as viewed) of the mount 23. As shown in FIG. 5, the retainer 52 is formed of the material of the airbag 35 and completely encircles the rod 50. The retainer 52 loops over the rod 50 and the looping part/structure includes ends 56, 58 that are each fixed to/formed with the inflatable part of airbag 35, Through combination of the airbag 35, with the retainer(s) 52, the rod 50 and the mount(s) 23, the airbag 35 is securely held to the body 15 and inclusion of the rod 50 provides retention at spaces between adjacent mounts 23. The retainer(s) 52 may be continuous between adjacent mounts 23, or substantially continuous between adjacent mounts 23, to effectively retain the airbag 35 during deployment.

The systems disclosed herein provide various benefits. For example, the systems disclosed herein provide a simplified installation system for airbags such as roof rail airbags with design simplicity and reduced components. In addition, the systems maintain the proper position of the airbag along its attached body components.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A supplemental inflatable restraint system for a vehicle comprising:
   a first mount having a first barrel section that has first tapered ends and having a first strap section that is connected to the vehicle;
   a second mount having a second barrel section that has second tapered ends and having a second strap section that is connected to the vehicle;
   an inflatable bag having a retainer; and
   a rod extending between, and connected with, the first mount and the second mount, the rod extending through the retainer and configured to secure the inflatable bag to the vehicle, the first barrel section of the first mount and the second barrel section of the second mount each immovably fixed to the rod to maintain relative position, wherein the first tapered ends and the second tapered ends are disposed along and taper to the rod, wherein the first and second mounts are configured to retain the rod in a fixed position relative to the vehicle.

2. The supplemental inflatable restraint system of claim 1, wherein during assembly the rod is configured to slip fit within the retainer.

3. The supplemental inflatable restraint system of claim 1, wherein the rod is substantially rigid and conformable to a profile of the vehicle during installation.

4. The supplemental inflatable restraint system of claim 1, wherein the vehicle includes a body with a roof rail, wherein the inflatable bag is secured to the roof rail by the mounts and the rod, wherein the rod is rigid and pre-formed before installation with bends that match a profile of the roof rail.

5. The supplemental inflatable restraint system of claim 1, wherein the rod is one of a plural number of rods retaining the inflatable bag, wherein each of the rods is fixed to the vehicle by a pair of mounts.

6. The supplemental inflatable restraint system of claim 1, wherein the retainer comprises a sleeve through which the rod extends, wherein the sleeve extends substantially completely between the first mount and the second mount.

7. The supplemental inflatable restraint system of claim 1, wherein the rod extends through the barrel section of the first and second mounts.

8. The supplemental inflatable restraint system of claim 1, wherein the rod extends through the barrel section of each of the first and second mounts, and wherein the barrel sections are welded to the rod.

9. The supplemental inflatable restraint system of claim 1, wherein the retainer completely encircles the rod.

10. The supplemental inflatable restraint system of claim 1, wherein the rod is pre-formed with bends that match a profile of the vehicle.

11. A supplemental inflatable restraint system for a vehicle comprising:
a first mount having a first barrel section having first tapered ends and having a first strap section that is fixed to the vehicle;
a second mount having a second barrel section having second tapered ends and having a second strap section that is fixed to the vehicle;
an inflatable bag;
a retainer connected with the inflatable bag; and
a rod extending between, and connected with, the first mount and the second mount, the rod extending through the retainer and configured to secure the inflatable bag to the vehicle, the first barrel section of the first mount and the second barrel section of the second mount each immovably fixed to the rod to maintain relative position, wherein the first tapered ends and the second tapered ends are disposed along and taper to the rod, wherein the first and second mounts are configured to retain the rod in a fixed position relative to the vehicle.

12. The supplemental inflatable restraint system of claim 11, wherein the retainer is configured to slip along the rod while being configured to remain secured to the rod during a deployment of the inflatable bag.

13. The supplemental inflatable restraint system of claim 11, wherein the rod is substantially rigid and conformable to a profile of the vehicle during installation of the inflatable bag in the vehicle.

14. The supplemental inflatable restraint system of claim 11, wherein the vehicle includes a body with a roof rail and an A-pillar, wherein the inflatable bag is secured to the roof rail and the A-pillar, wherein the rod is rigid and pre-formed before installation with bends that match a profile of the roof rail and the A-pillar.

15. The supplemental inflatable restraint system of claim 11, wherein the rod is one of a plural number of rods retaining the inflatable bag, wherein each of the rods is fixed to the vehicle by a pair of mounts.

16. The supplemental inflatable restraint system of claim 11, wherein the retainer comprises a sleeve through which the rod extends, wherein the sleeve extends substantially completely between the first mount and the second mount with a gap in the sleeve at the first mount.

17. The supplemental inflatable restraint system of claim 11, wherein the rod extends through the barrel section of each of the first and second mounts.

18. The supplemental inflatable restraint system of claim 11, wherein the rod extends through the barrel section of each of the first and second mounts, and wherein the strap section of each of the first and second mounts is secured to the vehicle by a fastener.

19. The supplemental inflatable restraint system of claim 11, wherein the rod extends from the second mount on both a first side of the second mount and a second side of the second mount, and wherein the inflatable bag is connected with the rod on both the first side and the second side.

20. A supplemental inflatable restraint system for a vehicle comprising:
a body of the vehicle having a roof rail;
a first mount having a first barrel section having first tapered ends and having a first strap section that is fixed to the roof rail;
a second mount having a second barrel section having second tapered ends and having a second strap section that is fixed to the roof rail;
an inflatable bag;
a retainer connected with the inflatable bag, the retainer comprising a structure with loops, the structure including ends that are each fixed to the inflatable bag; and
a rod extending between, and connected with, the first mount and the second mount, the rod extending through the loops of the retainer and configured to secure the inflatable bag to the vehicle, the first barrel section of the first mount and the second barrel section of the second mount each immovably fixed to the rod to maintain relative position, wherein the first tapered ends and the second tapered ends are disposed along and taper to the rod, wherein the first and second mounts are configured to retain the rod in a fixed position relative to the vehicle,
wherein the rod is one of a plural number of rods retaining the inflatable bag, wherein each of the rods is fixed to the vehicle by a pair of mounts,
wherein the vehicle includes the body with the roof rail, wherein the inflatable bag is secured to the roof rail by the mounts and the rods, wherein the rods are rigid and pre-formed before installation with bends that match a profile of the roof rail.

* * * * *